Nov. 17, 1964 I. LIEBERMAN ETAL 3,156,973
METHOD OF PRODUCING INTERIOR SURFACE CONTOUR
ON TUBULAR PART BY EXPLOSIVE FORMING
Filed April 12, 1962
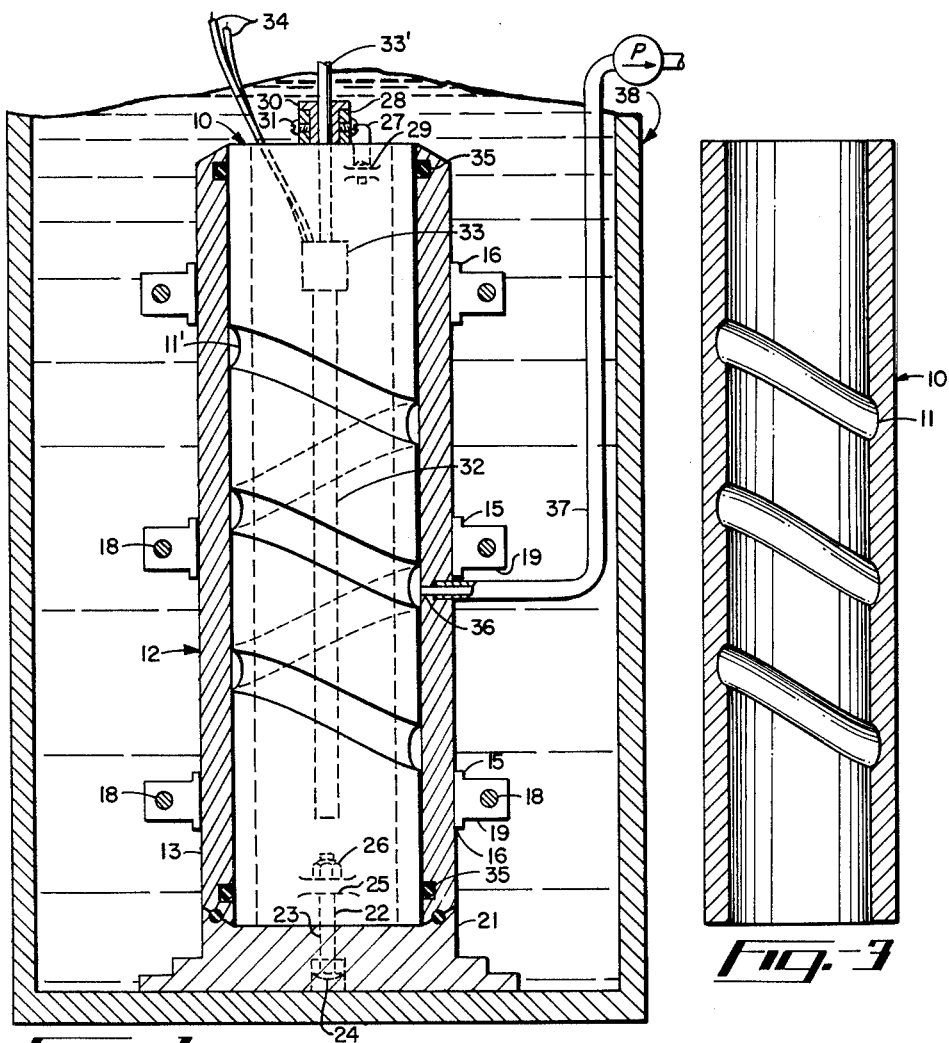
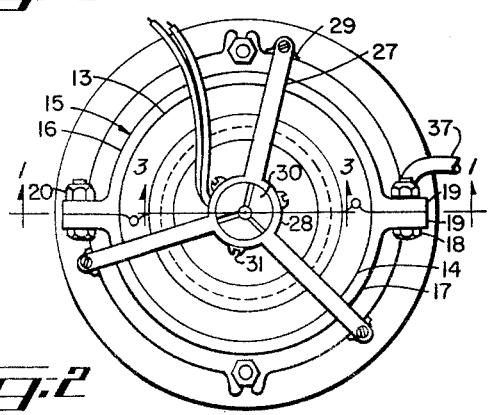
INVENTOR.
LOUIS ZERNOW
IRVING LIEBERMAN
PAUL B. BARNETT
BY
ATTORNEY 3,156,973
METHOD OF PRODUCING INTERIOR SURFACE CONTOUR ON TUBULAR PART BY EXPLOSIVE FORMING
Irving Lieberman, Covina, and Louis Zernow and Paul B. Barnett, Glendora, Calif., assignors to Aerojet-General Corporation, Azusa, Calif., a corporation of Ohio
Filed Apr. 12, 1962, Ser. No. 186,986
3 Claims. (Cl. 29—421)

This invention relates to a method for producing tubular or hollow metal parts of such character that a required interior surface contour may be readily produced therein which, if using usual machining methods and tools, might prove difficult or impossible to form with accuracy.

It is an object of the invention to machine the desired contour to be produced on the interior surface of a tubular or hollow part by machining or removing metal from the exterior surface of the part, then positioning the part in a mold the interior surface of which supports the outer surface of the part at all points except where material has been removed, and then inverting the contour by explosive pressure applied to the interior of the part forcing the material of the part to flow into the areas from which outer surface material was removed, thus producing on the inner surface of the part the desired configurations.

Since the outer surface of the part and the inner surface of the mold may be worked by ordinary machining procedures, a close fit of the exterior of the part with the inner surface of the mold is readily secured, after which the contour to be recessed into the inner surface of the part is cut into the outer surface thereof and then transferred to the inner surface by the procedure referred to.

A further object of the invention is to provide a method for simultaneously bringing to final dimensions the exterior of a hollow or tubular part and forming in the inner surface thereof a desired configuration.

Still further objects and features of the invention will appear from a study of the following description read with reference to the accompanying illustrative drawings.

In the drawings:
FIGURE 1 is a vertical median cross-section through a mold on the line 1—1 in FIGURE 2, a tubular part to be formed with an internal helical groove being shown, in full lines, positioned in the mold;
FIGURE 2 is a top plan view of the tubular part in the mold shown in FIGURE 1; and
FIGURE 3 is a section, on the line 3—3 in FIGURE 2, through the part after it has been formed.

Referring now to FIGURE 1 the numeral 10 indicates a tubular workpiece which, when formed in accordance with the method of the present invention, will have a length of helical groove 11 in its inner surface positioned inwardly of the ends thereof as seen in FIGURE 3.

While the interior length of groove 11 might possibly be formed by the use of special tools, which would be expensive to make, it would still be difficult to accurately gauge the cut, making for a lengthy and expensive job.

The form of workpiece is given by way of example only since it is believed the procedure to be described may be employed in many cases where it is expensive and difficult to work on interior surfaces of parts.

Referring again to FIGURE 1, the tubular workpiece 10 is first accurately machined on a lathe to cut a length of groove 11′ in the exterior face of workpiece 10 in correct position and with the depth and contour of the cut accurately made since it can be readily checked by use of standard types of checking gauges. It is to be assumed that the O.D. of the workpiece is required to be accurately brought to fine tolerances as is the I.D., and that the workpiece is to be truly cylindrical. If a piece of tubular cylindrical material having a bore therethrough of the correct diameter is not available a workpiece can be produced to accurate dimensions by standard procedures prior to cutting the length of helical groove in the surface of the workpiece.

The workpiece 10 is then placed in a sectional mold 12 comprising two halves 13, 14 clamped together by hoops 15. The hoops may be formed in two parts 16, 17 pulled together by bolts 18 passing through brackets 19 at the ends of the half-hoops 16, 17 and nuts 20 tightened upon the bolts. Mold 12 should, of course, be a close fit about the workpiece. The mold with the workpiece mounted therein is then positioned on a base 21 and secured thereto by tie bars 22 passing through holes 23 in the flange of the base. Heads 24 of the tie bars are received in sockets in the underside of the flange of the base. The shanks of the tie bars pass between the fingers of brackets 25 welded to the outer surface of the mold 12 and nuts 26 are tightened on the bars against brackets 25.

An explosive positioning spider 27 is positioned over the open upper end of the mold 12. The arms of the spider radiate from a central hub 28 and the outer ends of the arms are screwed to small brackets 29 welded to the outer surface of the mold. The central hub 28 is bored to receive segmental jaw members 30 which may be tightened inwardly by set screws 31.

Explosive in the form of a rod 32 is supplied with the usual electric detonator cap (not shown) contained in a liquid proof canister 33 mounted at the top of the rod of the explosive 32. An extension 33′ extends upwardly from the canister 33 and is gripped in the central hub 28 to position the rod 32. Electric leads 34 extend from the detonator cap and are connected to an electrical firing device (not shown). It will be appreciated that other explosive devices such as a conventional Primacord charge or an explosive liquid filled plastic tube would be suitable to provide the explosive force required to form the finished part.

Sealing means in the form of packing or sealing rings 35 surround the workpiece 10 at each end thereof to seal against air and water leakage between the exterior wall of the workpiece and the interior wall of the mold. To permit the groove portion of the workpiece to be expanded against the wall of the mold, the air between the workpiece and the mold should be evacuated. To this end, a vacuum port 36 is provided in the wall of the mold and is connected to a vacuum pump P by a conduit 37. Preferably, the pump should be capable of evacuating the air between the workpiece and mold to a pressure of 28 inches of mercury.

Preferably the mold 12 and workpiece are placed in a deep tank of water indicated at 38 in FIGURE 1 since it has been determined that the hydrostatic head of the water or other liquid aids the forming force of the exploding explosive in shaping the workpiece to follow the contours of the inner surface of the mold. Work has been successfully carried out in a tank having some nine feet of water above the work.

In an alternative and simplified embodiment of the invention, not illustrated, a solid one-piece mold instead of a segmented mold may be used, thus eliminating the hoops 15 and bolts 18 of the embodiment seen in FIGURE 1. However, by using a one piece mold, it is essential that the dimensional tolerances of the O.D. of the workpiece and the I.D. of the mold be kept to a minimum to assure a close fit between the mating surfaces thereof. Also an alternative spider arrangement could be used in place of spider 27 for positioning the explosive rod 32. For example, two spiders could be used, one positioned at the bottom of the mold and the other on top thereof, gripping and centering the explosive charge in the workpiece.

It should be kept in mind that the exterior shape or contour to be given to the interior surface of the hollow or tubular workpiece may be of an infinite variety, the outer surface of the workpiece being machined to be transferred to the inner surface by the force of the explosion driving the outer surface of the workpiece to be in intimate contact with the inner surface of the mold.

An embodiment of the invention has been described and shown herein by way of example but not as limitative of the scope of the invention since various modifications may be made by those skilled in the art without departing from the scope of the invention as defined by the appended claims.

We claim:

1. A method of producing a desired design recessed into the inner surface of a hollow part having at least one open side, comprising: removing material from portions of the outer surface of the part to produce the desired design when transferred to the inner surface of the part; positioning the part in a mold having a substantially continuous inner surface abutting the whole outer surface of the part from which material has not been removed, the inner surface of the mold continuing the contour thereof in spaced relationship over the portions of the outer surface of the part from which material has been removed; positioning a quantity of explosive in said part in an amount and in a form capable of exerting sufficient force when detonated to drive the material of the part underlying the portions of the outer surface of the part from which material has been removed into abutment with the inner surface of the mold; detonating the explosive by any suitable means; and removing the formed part from the mold.

2. A method as set forth in claim 1 including the additional step of filling the interior of said part with liquid before detonating the explosive.

3. A method as set forth in claim 1 further including the step of positioning the mold with the part to be formed received therein in a tank of liquid of sufficient depth prior to the detonation of the explosive so that the hydrostatic head assists the detonated explosive in forming the part.

References Cited in the file of this patent

UNITED STATES PATENTS

| | | |
|---|---|---|
| 1,270,402 | Fulton | June 25, 1918 |
| 2,683,928 | Carson | July 20, 1954 |
| 2,969,758 | Howlett et al. | Jan. 31, 1961 |
| 2,983,242 | Cole | May 9, 1961 |
| 3,032,857 | Lyon | May 8, 1962 |
| 3,036,373 | Drexelius | May 29, 1962 |
| 3,036,374 | Williams | May 29, 1962 |
| 3,060,879 | Staba | Oct. 30, 1962 |
| 3,064,344 | Arne | Nov. 20, 1962 |